United States Patent
Hoche et al.

(10) Patent No.: US 6,962,132 B2
(45) Date of Patent: Nov. 8, 2005

(54) INTAKE ARRANGEMENT FOR AN INTERNAL COMBUSTION ENGINE

(75) Inventors: Florian Hoche, Waiblingen (DE); Niels Kunert, Sindelfingen (DE); Heiko Rosskamp, Adelberg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 10/935,092

(22) Filed: Sep. 8, 2004

(65) Prior Publication Data

US 2005/0051118 A1 Mar. 10, 2005

(30) Foreign Application Priority Data

Sep. 8, 2003 (DE) ......................................... 103 41 230

(51) Int. Cl.⁷ .............................................. F02B 33/04
(52) U.S. Cl. ................................................... 123/73 A
(58) Field of Search ........................... 123/73 A, 73 R, 123/73 PP; 261/23.1, 23.3

(56) References Cited

U.S. PATENT DOCUMENTS

| 6,101,991 A | * | 8/2000 | Glover .................... 123/73 PP |
| 6,634,326 B2 | * | 10/2003 | Radel et al. ............. 123/73 PP |
| 2003/0106508 A1 | | 6/2003 | Rosskamp |

* cited by examiner

Primary Examiner—Mahmoud Gimie
(74) Attorney, Agent, or Firm—Walter Ottesen

(57) ABSTRACT

An intake arrangement for an internal combustion engine includes an intake channel (80) which connects the clean side (81) of an air filter (41) to the engine. The intake channel (80) is subdivided by a partition wall (11) into an air channel (8) and a mixture channel (21). A throttle flap is mounted in the intake channel (80). A fuel opening (27, 28) for supplying fuel opens into the mixture channel (21). In order to avoid a throw back of fuel from the mixture channel (21) into the air channel (8), it is provided that the clean side (81) of the air filter (41) is divided into two chambers (82 and 83) and the mixture channel (21) opens into the first chamber (82) and the air channel (8) opens into the second chamber (83).

16 Claims, 3 Drawing Sheets

INTAKE ARRANGEMENT FOR AN INTERNAL COMBUSTION ENGINE

CROSS REFERENCE TO RELATED APPLICATION

This application claims priority of German patent application no. 103 41 230.1, filed Sep. 8, 2003, the entire content of which is incorporated herein by reference.

FIELD OF THE INVENTION

The invention relates to an intake arrangement for internal combustion engines especially for the two-stroke engine in a portable handheld work apparatus such as a motor-driven chain saw, cutoff machine or the like.

BACKGROUND OF THE INVENTION

U.S. patent publication U.S. 2003/0106508 A1 discloses an intake arrangement wherein the intake channel is subdivided by a partition wall into a mixture channel and an air channel. In the intake channel, a throttle flap is mounted and a choke flap can be provided upstream of the throttle flap. The partition wall of the intake channel is lengthened into the region of the air filter in order to avoid that fuel from the mixture channel is drawn by suction into the air channel.

SUMMARY OF THE INVENTION

It is an object of the invention to provide an intake arrangement of the kind described above which has a simple configuration and ensures a good separation of the air channel and the mixture channel.

The intake arrangement of the invention is for an internal combustion engine including a two-stroke engine. The intake arrangement includes: an air filter having a clean end portion; an intake channel connecting the clean end portion of the air filter to the engine; the intake channel having a partition wall for partitioning the intake channel into a mixture channel and an air channel; a throttle flap mounted in the intake channel; fuel opening means opening into the mixture channel for metering fuel thereinto; the clean end portion being subdivided into first and second chambers; and, the mixture channel opening into the first chamber and the air channel opening into the second chamber.

The air channel and the mixture channel are completely separated from each other upstream of the throttle flap because the clean side of the air filter is subdivided into two chambers. Because of the subdivision of the clean air side of the air filter, a penetration of fuel into the air channel via the clean space of the air filter is no longer possible. In a two-stroke engine, the air, which is supplied to the engine, can be used as a scavenging prestore. In this way, it is ensured that, especially in the region of full load (when the throttle flap is completely opened and mixture channel and air channel are separated from each other also in the region of the throttle flap), no mixture can reach the air channel. For this reason, the air from the air channel, which is used for the air prestorage, is free of fuel and thereby leads to a good separation of exhaust gases and after-flowing fresh mixture. In this way, it is prevented that mixture, which is uncombusted, flows from the combustion chamber. In this way, good exhaust-gas values and a low consumption of the engine result.

The air filter advantageously has an air filter housing and the mixture channel and the air channel are extended into the air filter housing. The entry openings into the air channel and the mixture channel can, in this way, be arranged in a flexible manner. Advantageously, the clean side of the air filter is subdivided into two chambers by a partition wall. A simple way of manufacturing results when the partition wall is configured as one piece with a housing section of the air filter housing. The air filter housing is made of plastic, especially, in an injection-molding process. Additional individual parts are avoided by the one-piece configuration.

Advantageously, a choke element is mounted in the air filter which substantially closes the air channel and the mixture channel in the closed position thereof and clears the air channel and the mixture channel in the open position thereof. A flap in the partition wall in the intake channel can be avoided by the arrangement of the choke element as an external choke in the air filter. With the choke element in the air filter housing, the two channels, which are separated from each other, can be switched with a common choke element. The flow cross sections can be adapted to the internal combustion engine via the extension of the air channel and the mixture channel into the air filter. Furthermore, a simple configuration of the choke element results.

Advantageously, the air channel and the mixture channel have respective entry windows with the choke element being mounted on the entry windows. The size of the entry windows can be adapted in a simple manner to the internal combustion engine so that a good adaptation to the engine is possible. Different flow cross sections can be generated at the entry into the air channel and into the mixture channel by changing the size of the entry windows. Advantageously, the flow direction through the entry window runs transversely to the flow direction in the intake channel. The inducted air is thereby deflected in the region of the entry windows. In this way, the throw back of fuel from the mixture channel into the air filter is avoided because the thrown-back fuel collects in the region of the deflection.

Advantageously, the choke element has two choke sections. In the closed position, a first choke section substantially closes the air channel and a second choke section substantially closes the mixture channel. With the arrangement of two choke sections, which are actuated in common, different opening and closing times of the air channel and mixture channel can be constructively fixedly pregiven. In this way, the running performance of the engine can be improved. Intermediate positions can also be realized whereat the channels are open at different widths. Furthermore, it is possible, also in the closed position, to constructively fixedly pregive a certain opening of one channel, especially of the mixture channel.

The choke element has two cutouts which are arranged in the region of the entry windows in the open position. The opening and closing can be realized in a simple manner via the coaction of the cutouts with the entry windows. The choke element has an essentially cylindrical base body which has the cutouts. The cylindrical base body functions simultaneously to guide the choke element on the air filter housing. The cylindrical base body can be supported directly on the air filter housing so that no additional components for supporting or fixing the choke element are necessary. The choke element is rotatable about an axis parallel to the longitudinal axis of the intake channel.

The choke element has a disc which extends transversely to the longitudinal axis of the intake channel and an actuating element is fixed thereto. The choke element can be rotated in a simple manner via the actuating element between the closed position and the open position and, if needed, additional switching positions. The disc simultaneously delimits the sections of the air channel and mixture channel, which are configured in the air filter, toward the filter element. A simple configuration results when the actuating element extends through the filter element to the outside of the filter housing. The filter element advantageously lies on the disc so that the choke element is held in the air filter housing by the filter element. A stop is arranged on the housing of the filter and fixes at least one position of the choke element. A simple configuration results when the stop is formed by the partition wall. A low number of individual parts results when the entry windows are delimited by a wall section which is configured as one piece with a housing section of the air filter housing.

BRIEF DESCRIPTION OF THE DRAWINGS

The invention will now be described with reference to the drawings wherein.

DESCRIPTION OF THE PREFERRED EMBODIMENTS OF THE INVENTION

Figure 2:
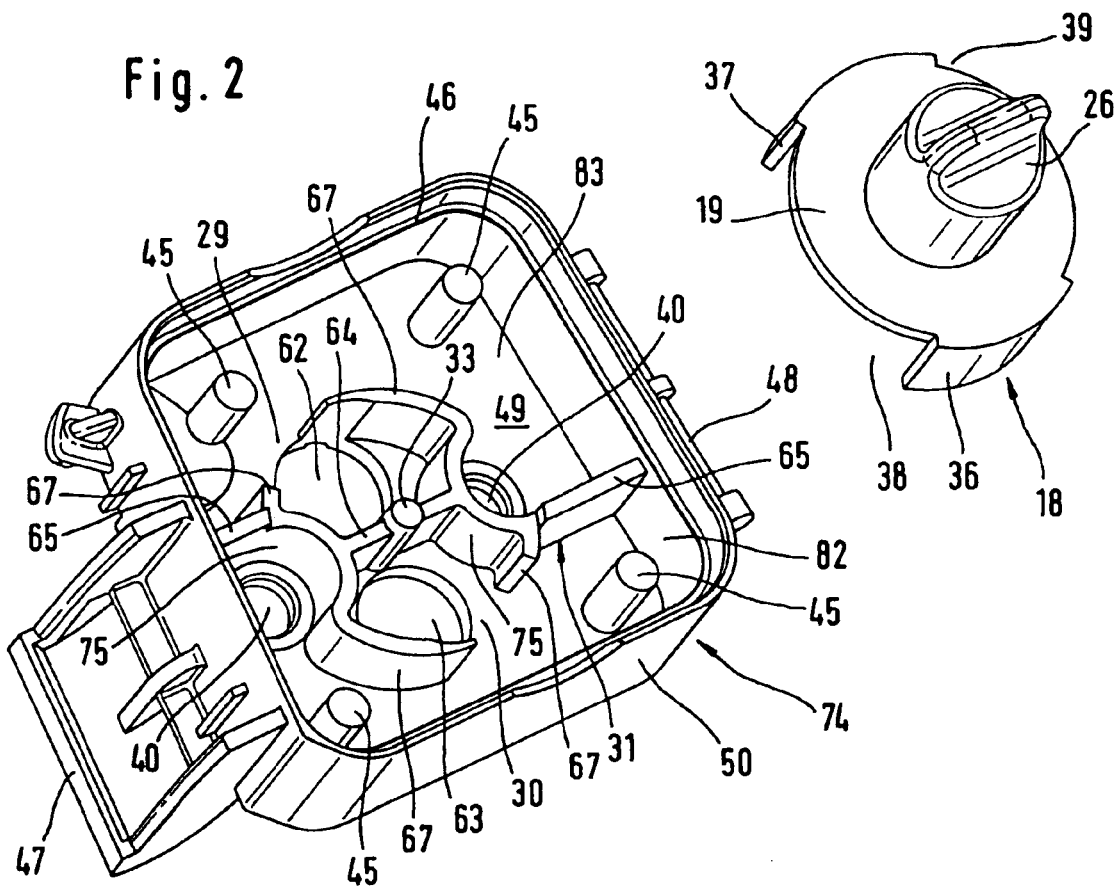
FIG. 2 is an exploded perspective view showing the lower shell of an air filter housing with a choke element.

The internal combustion engine shown in FIG. 2 is configured as a two-stroke engine 1. The engine has a cylinder 2 in which a combustion chamber 3 is formed. The combustion chamber 3 is delimited by a reciprocating piston 5. The piston 5 drives a crankshaft 7 via a connecting rod 6. The crankshaft 7 is rotatably journalled in a crankcase 4. The crankcase 4 is fluidly connected to the combustion chamber 3 via transfer channels 12 and 15 at the region of bottom dead center of the piston 5. The two-stroke engine 1 has an inlet 20 whereat a mixture channel 21 opens. The engine 1 also has an air inlet 9 at which an air channel 8 opens. The air channel 8 and the mixture channel 21 are configured in an intake channel 80 which is subdivided by a partition wall 11 into the air channel 8 and the mixture channel 21. The piston 5 has a piston pocket 14 which connects the air inlet 9 at the region of top dead center of the piston 5 to the transfer windows 13 and 16 of the transfer channels 12 and 15, respectively. An outlet 10 leads out from the combustion chamber 3 and exhaust gases from the combustion chamber 3 flow out therethrough.

Figure 1:
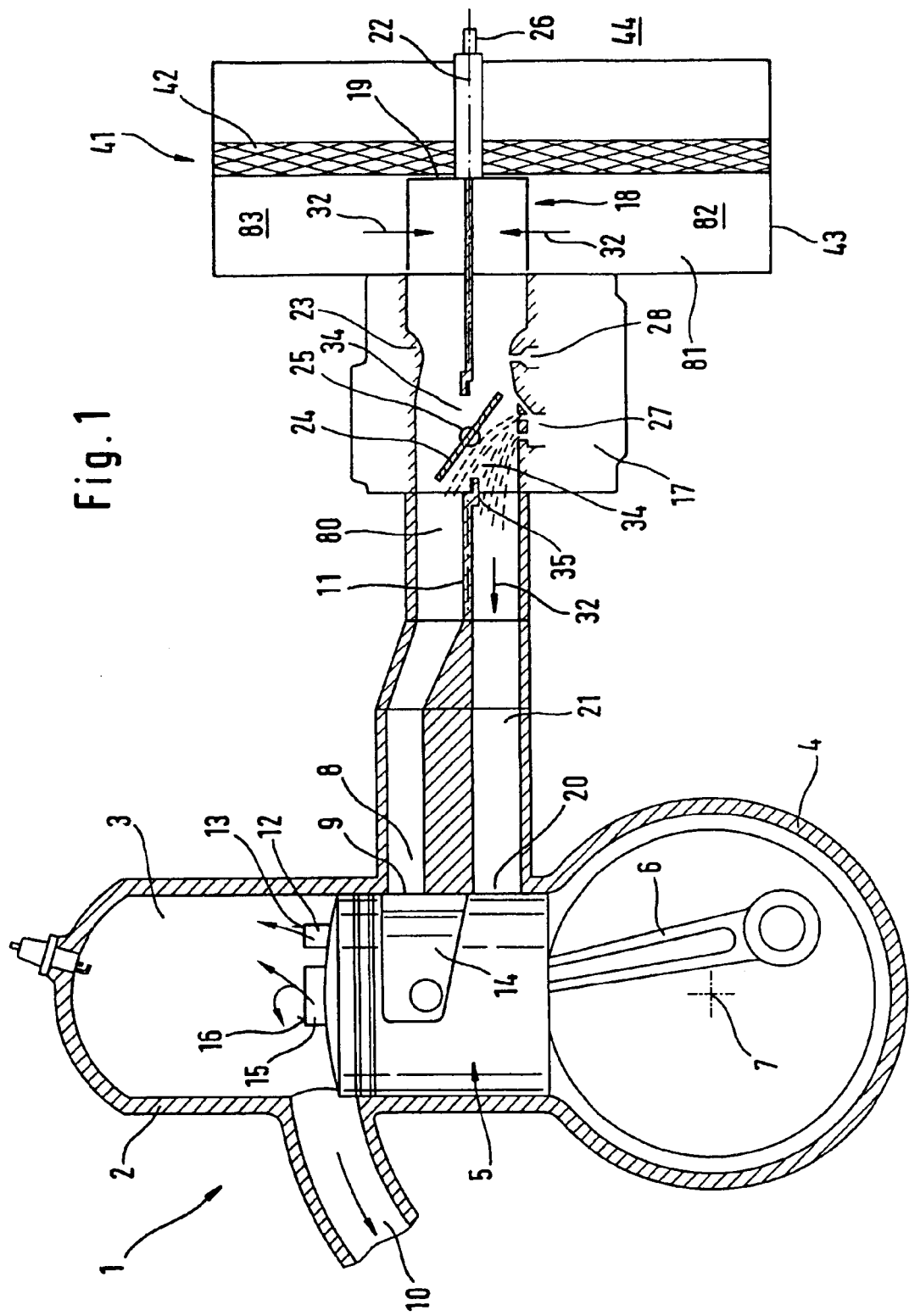
FIG. 1 is a schematic section view of an intake arrangement of a two-stroke engine.

An intake arrangement is provided for supplying air and an air/fuel mixture to the two-stroke engine 1. The intake arrangement includes the intake channel 80, a carburetor 17 and an air filter 41. A section of the intake channel 80 is configured in the carburetor 17. The carburetor has a venturi 23 and a main fuel opening 28 opens into the mixture channel 21 in the region of the venturi. Referred to the flow direction 32 from the air filter 41 to the two-stroke engine 1, a throttle flap 24 is pivotally journalled with a throttle shaft 25 in the carburetor 17 downstream of the venturi 23. Idle fuel openings open into the mixture channel 21 in the region of the throttle flap 24. The partition wall 11 has a circularly-shaped cutout in the region of the throttle flap 24. The circularly-shaped cutout has a peripherally-extending edge 35 on which the throttle flap 24 lies in the completely open position and so separates the air channel 8 from the mixture channel 21. For the half-throttle position shown in FIG. 1, the throttle flap is not completely opened so that passthrough openings 34 are formed between the throttle flap 24 and the partition wall 11. A pressure compensation between the air channel 8 and the mixture channel 21 can take place via the passthrough openings 34.

The air filter 41 is arranged upstream of the carburetor 17. The air filter 41 includes an air filter housing 43 wherein a filter element 42 is arranged. The filter element 42 separates the contaminant side of the air filter 41 from its clean side 81. The clean side 81 of the air filter 41 is partitioned into a first chamber 82 and a second chamber 83. The mixture channel 21 opens into the first chamber 82 and the air channel 8 opens into the second chamber 83. The air channel and mixture channel are extended into the air filter 41. A choke element 18 is arranged in the air filter 41 in the region of the entry windows into the air channel 8 and the mixture channel 21. The choke element 18 includes a disc 19 which is arranged approximately perpendicularly to the longitudinal axis 22 of the intake channel. The disc 19 lies on the filter element 42 at the clean side 81. An actuating element 26 is fixed on the disc 19. The actuating element 26 projects through the filter element 42 to the outer side 44 of the air filter housing 43. The choke element 18 can be switched via the actuating element 26 between a closed position and an open position.

During operation of the two-stroke engine 1, the choke element 18 is first closed for starting the engine. The air channel 8 and the mixture channel 21 are substantially closed by the choke element 18. With the movement of the piston 5 in the cylinder 2, a high underpressure develops in the intake channel 80 which leads to the situation that much fuel is moved through the fuel openings 27 and 28 into the mixture channel. The pressure between the air channel 8 and the mixture channel 21 can be compensated via the passthrough openings 34. After starting the engine, the choke element 18 is opened so that the air channel 8 and the mixture channel 21 are connected to the clean side 81 of the air filter 41. At full load, the completely opened throttle flap 24 and the partition wall 11 completely separate the air channel 8 from the mixture channel 21. In the position of the piston 5 shown in FIG. 1 in the region of bottom dead center, an air/fuel mixture flows from the crankcase 4 through the transfer channels 12 and 15 into the combustion chamber 3. During the downward movement of the piston 5, the air/fuel mixture is compressed. The inlet 20 into the crankcase 4 opens so that an air/fuel mixture can flow into the crankcase 4 from the mixture channel 21. In the region of top dead center of the piston 5, the air channel 8 is connected via the piston pocket 14 to the transfer channels 12 and 15. Air from the air channel 8 flows into the transfer channels 12 and 15 and displaces the air/fuel mixture out of the transfer channels 12 and 15 toward the crankcase 4. In the region of top dead center of the piston 5, the air/fuel mixture is ignited in the combustion chamber.

With the subsequent downward stroke of the piston 5, the outlet 10 out of the combustion chamber 3 is first cleared so that the exhaust gases can leave the combustion chamber 3. Thereafter, the transfer windows 13 and 16 of the transfer channels 12 and 15, respectively, begin to open. From the transfer channels 12 and 15, the prestored air first flows into the combustion chamber 3. Thereafter, air/fuel mixture follows out of the crankcase 4. The prestored air separates the out-flowing exhaust gases from the in-flowing air/fuel mixture.

With the complete separation of the air channel 8 from the mixture channel 21, it is ensured that no mixture from the mixture channel 21 can reach the air channel 8 and flow out from the combustion chamber 3 uncombusted with the exhaust gases. Because of the pulsations in the mixture channel 21 (especially at full load), the fuel from the carburetor 17 can be thrown back into the air filter 41. The flow direction 32 in the region of the choke element 18 is transverse to the flow direction 32 in the intake channel 80. With the deflection in the region of the choke element, the situation can be substantially prevented that thrown-back fuel reaches the filter element and clogs the same.

Figure 3:
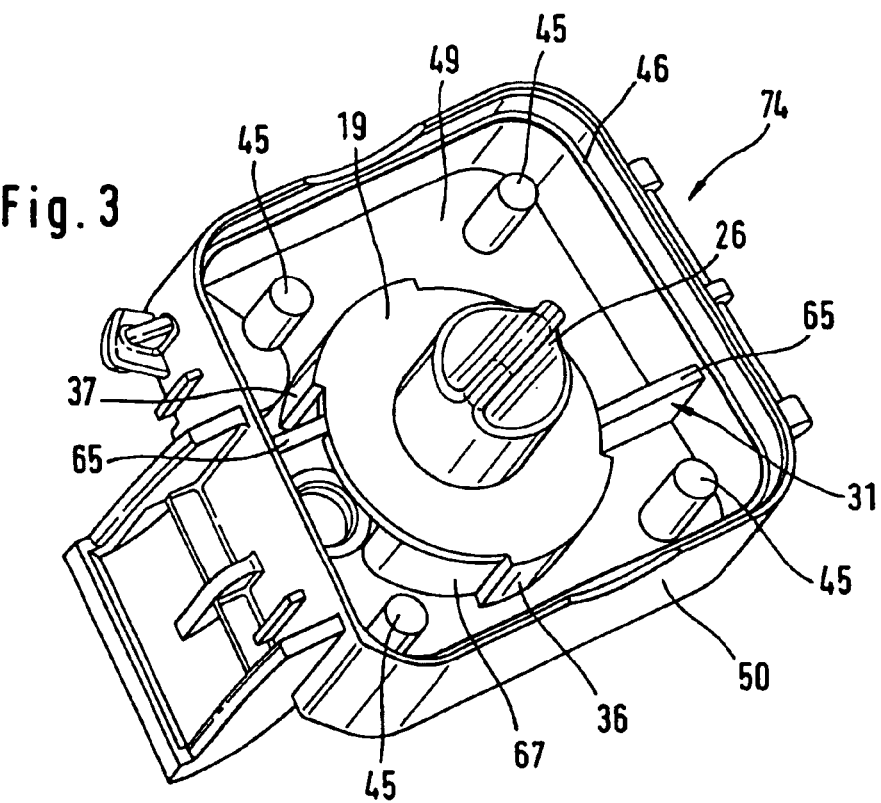
FIG. 3 is a perspective view of the lower shell of the air filter housing with the choke element of FIG. 2 mounted in the lower shell; and, FIG. 4 is an exploded view of the lower shell of the air filter housing with a choke element.

FIGS. 2 and 3 show an embodiment for an air filter housing 43 having a choke element 18. Only the lower shell 74 of the air filter housing 43 is shown. This lower shell 74 lies against the carburetor 17. The lower shell 74 of the air filter 41 has an air filter base 49 which lies against the carburetor 17 as well as a side wall 50 which runs approximately parallel to the longitudinal axis 22 of the intake channel. Two openings 62 and 63 are provided in the air filter base 49 and the air channel 8 and the mixture channel 21 open at these openings 62 and 63 at the air filter base 49.

A partition wall 31 is formed on the lower shell 74 and this partition wall separates the clean side of the air filter 41 into a first chamber 82 and a second chamber 83. The clean side of the air filter 41 is arranged in the lower shell 74. A peripherally-extending slot 46 runs on the side wall 50 of the lower shell 74. The filter element 42 lies on the slot 46 and a sealing lip of the filter element 42 can be arranged in the slot 46.

As FIG. 3 shows, the slot 46 runs at an elevation with the edge sections 65 of the partition wall 31 and with the disc 19 of the choke element 18. The filter element 42 lies on the slot 46, the edge sections 65 and the disc 19 of the choke element 18. Furthermore, four lugs 45 are formed on the air filter base 49. The lugs 45 extend up to the elevation of the slot 46 and the filter element 42 lies on these lugs 45.

The lower shell 74 is closed by a cover (not shown) through which the actuating element 26 of the choke element 18 projects.

The air filter base 49 has two attachment openings 40 at which the air filter can be fixed to the carburetor 17. An attachment opening 40 is provided in each chamber (82, 83). On the outer side of the lower shell 74, a support pin 48 is arranged and a holding strut 47 is arranged on the opposite-lying side. The lower shell 74 can be pivotally supported on the support pin 48 and can be clamped against the carburetor 17 with the holding strut 47.

As shown in FIG. 2, the two openings 62 and 63 are approximately arranged in the center in the air filter base 49 one next to the other. The two openings 62 and 63 are separated from each other by a center section 64 of the partition wall 31. The center section 64 has a support lug 33 arranged in the middle. The support lug 33 extends in an extension of the longitudinal axis 22 of the intake channel. The choke element 18 is rotatably journalled about the longitudinal axis 22 of the intake channel on the support lug 33. The center section 64 extends between the two attachment openings 40 radially to the longitudinal axis 22 and runs at the edge of the openings 40 in the form of a quarter circle about the openings 40 and then continues into the edge sections 65. A wall section 67 is formed on both ends of the arcuately-shaped extending section 75 of the center section 64 of the partition wall 31. With the exception of the section running in the region of the opening 40, the wall section 67 extends in the peripheral direction to the longitudinal axis 22 and to the support lug 33. The wall sections 67 thereby form wall sections of the air channel 8 and the mixture channel 21 which extend into the air filter 41. Two wall sections 67 bound an entry window 29 of the air channel 8 and two second wall sections 67 bound an entry window 30 of the mixture channel 21. The openings 62 and 63 can be additionally surrounded by flow guide elements which facilitate the deflection of the flow and reduce the flow resistance.

The choke element 18 has a cylindrical base body which has two choke sections 36 and 37 and two cutouts 38 and 39 lying therebetween. The choke sections 36 and 37 engage over the wall sections 67 and are thereby arranged in flow direction upstream of the entry windows 29 and 30 in the region thereof. The cylindrical section is fixed to a disc 19 which extends perpendicularly to the longitudinal axis 22 of the intake channel and the actuating element 26 is fixed to the disc 19. As shown in FIG. 3, the disc 19 with the edge sections 65 of the partition wall conjointly define a plane. The edge sections 65 form a stop for the closed position of the choke element 18 wherein the choke sections 36 and 37 lie against the edge sections 65 of the partition wall 31. The times, at which the air channel and the mixture channel are connected to the air filter 41, can be adjusted via the arrangement of the choke sections 36 and 37 on the periphery of the choke element 18. The partition wall 31, the bearing lug 33 and the lugs 45 are configured as one piece with the lower shell 74 so that the lower shell 74 with the choke element 18 comprises only two individual parts. The lower shell 74 can be manufactured especially of plastic in an injection-molding process.

Figure 4:
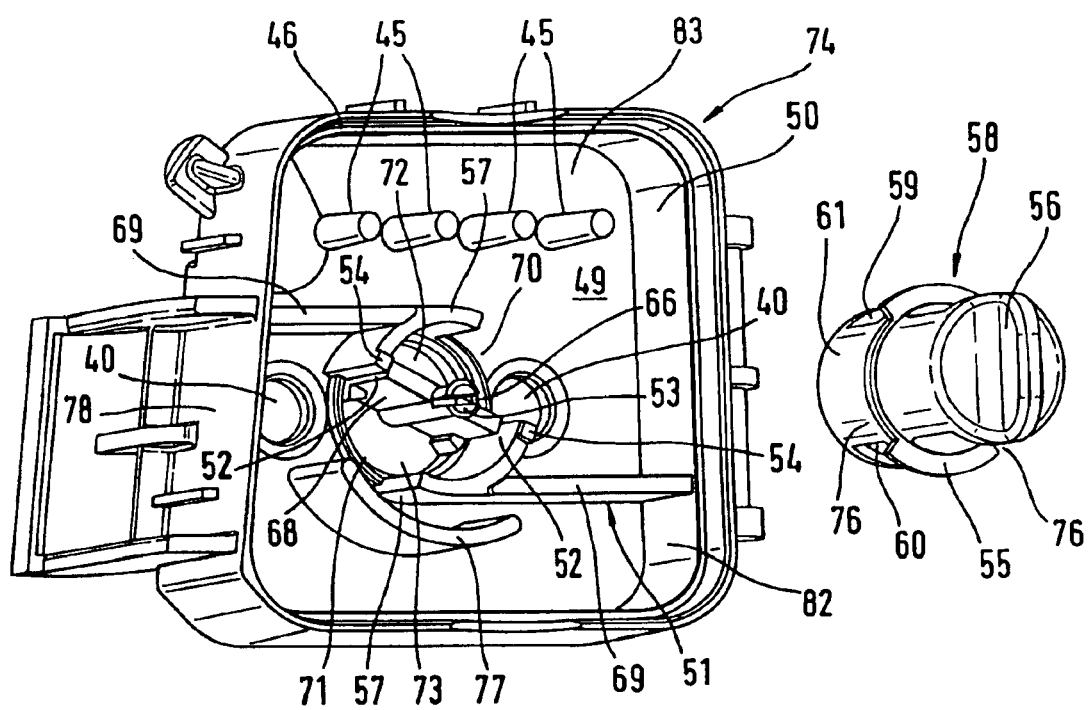

An embodiment of a lower shell 74 with a choke element 58 is shown in FIG. 4. The choke element 58 likewise includes a cylindrical base body on which two cutouts 59 and 60 are provided with choke sections 61 lying therebetween. A disc 55 extends perpendicularly to the cylindrical section and this disc projects beyond the cylindrical base body and has cutouts 76 on its outer periphery. An actuating element 56 is formed on the side of the disc 55 lying opposite to the cylindrical base body.

The lower shell 74 in FIG. 4 includes a partition wall 51 which partitions the clean side of the air filter into a first chamber 82 and a second chamber 83. The partition wall 51 has a center section 68 and the cylindrical section of the choke element 58 engages over this section 68. The choke element 58 projects into the gaps 52 formed on both sides of the center section 68. Openings 72 and 73 in the base 49 of the air filter are arranged on both sides of the center section 68 of the partition wall 51. The openings 72 and 73 are each configured to have a half-circular shape and the air channel 8 and the mixture channel 21 open into these openings at the air filter 41. The center section 68 runs as an extension of the partition wall 11 in the intake channel 80 and separates the air channel 8 and the mixture channel 21 from each other which extend into the air filter housing 43. Edge sections 69 of the partition wall 53 run radially outside of the gaps 52. The edge sections 69 run first in a shape of a part-circle along the periphery of the openings 72 and 73 and extend to the edge 50 of the lower shell 74. A stop 54 is arranged on the arcuately-shaped extending section. The stop 54 is arranged in the cutouts 76 of the disc 55 of the choke element 58 and, with the cutouts 76, fixes the two end positions of the choke element 58.

A wall section 57 is formed on each of the bent sections of the partition wall 51. The wall section 57 runs on the outer periphery of the openings 72 and 73 and delimits the entry windows 70 and 71 into the air channel 8 and mixture channel 21, respectively. A bearing lug 53 is formed centrally on the center section 68 of the partition wall 51. This bearing lug 53 has a slot 66. The choke element 58 can be clipped onto the bearing lug 53. The bearing lug 53 extends in the direction of the longitudinal axis 22 of the intake channel.

The lower shell 74, which is shown in FIG. 4, has a peripherally-extending slot 46 and a lug 45 on the side wall 50. The slot 46 and the lug 45 project into the interior of the second chamber 83. A filter element lies on the edge sections 69 of the partition wall 51, the slot 46 and the lug 45. Likewise, the filter element can lie on the sections of the disc 55 which project above the actuating element 56. In this way, the choke element 58 is fixed in the air filter 41. A throw-back wall 77 is arranged radially outside of the opening 73 of the mixture channel 21. The throw-back wall 77 collects the fuel thrown back out of the mixture channel 21 and conducts the same to the base region 78 of the air filter shown to the left in FIG. 4. From there, the fuel can again be taken up with the next induction and be supplied to the mixture channel.

It is understood that the foregoing description is that of the preferred embodiments of the invention and that various changes and modifications may be made thereto without departing from the spirit and scope of the invention as defined in the appended claims.

What is claimed is:

1. An intake arrangement for an internal combustion engine including a two-stroke engine, the intake arrangement comprising:

an air filter having a clean end portion;

an intake channel connecting said clean end portion of said air filter to said engine;

said intake channel having a partition wall for partitioning said intake channel into a mixture channel and an air channel;

a throttle flap mounted in said intake channel;

fuel opening means opening into said mixture channel for metering fuel thereinto;

said clean end portion being subdivided into first and second chambers;

said mixture channel opening into said first chamber and said air channel opening into said second chamber; and, said first and second chambers being separated from each other so as to prevent a penetration of fuel into said air channel via said clean end portion of said air filter.

2. The intake arrangement of claim 1, wherein said air filter has an air filter housing with said air channel and said mixture channel being extended into said air filter housing.

3. The intake arrangement of claim 2, wherein said air filter includes a partition wall for partitioning said clean end portion into said first and second chambers.

4. The intake arrangement of claim 3, wherein said partition wall is formed as one piece with a section of said air filter housing.

5. The intake arrangement of claim 4, further comprising a choke element arranged in said air filter so as to be movable between a closed position whereat said air channel and said mixture channel are substantially closed and an open position wherein said air channel and said mixture channel are cleared.

6. The intake arrangement of claim 5, wherein said air channel and said mixture channel have respective entry windows; and, said choke element is mounted at said entry windows.

7. The intake arrangement of claim 6, wherein said choke element and said air filter housing are so configured that the flow direction through said entry windows is transverse to the flow direction in said intake channel.

8. The intake arrangement of claim 7, wherein said choke element has first and second choke sections for substantially closing said air channel and said mixture channel when said choke element is in said closed position.

9. The intake arrangement of claim 8, wherein said choke element has first and second cutouts which are in the region of corresponding ones of said entry windows when said choke element is in said open position thereof.

10. The intake arrangement of claim 9, wherein said choke element is a cylindrical base body having said first and second cutouts.

11. The intake arrangement of claim 5, wherein said intake channel defines a longitudinal axis and said choke element is rotatable about an axis parallel to said longitudinal axis.

12. The intake arrangement of claim 11, wherein said choke element has a disc extending transversely to said longitudinal axis; and, said disc has an actuating element fixed thereon.

13. The intake arrangement of claim 6, wherein said air filter housing includes a wall section bordering said entry windows and said wall section is formed as one piece with said air filter housing.

14. An intake arrangement for an internal combustion engine including a two-stroke engine, the intake arrangement comprising:

an air filter having a clean end portion;

an intake channel connecting said clean end portion of said air filter to said engine;

said intake channel having a partition wall for partitioning said intake channel into a mixture channel and an air channel;

a throttle flap mounted in said intake channel;

fuel opening means opening into said mixture channel for metering fuel thereinto;

said clean end portion being subdivided into first and second chambers;

said mixture channel opening into said first chamber and said air channel opening into said second chamber;

said air filter having an air filter housing with said air channel and said mixture channel being extended into said air filter housing;

said air filter including a partition wall for partitioning said clean end portion into said first and second chambers;

said partition wall being formed as one piece with a section of said air filter housing;

a choke element arranged in said air filter so as to be movable between a closed position whereat said air channel and said mixture channel are substantially closed and an open position wherein said air channel and said mixture channel are cleared;

said intake channel defining a longitudinal axis and said choke element being rotatable about an axis parallel to said longitudinal axis;

said choke element having a disc extending transversely to said longitudinal axis; and, said disc having an actuating element fixed thereon;

said air filter including a filter element adjacent said first and second chambers; and, said actuating element extending through said filter element to the outside of said air filter housing.

15. The intake arrangement of claim 5, wherein said air filter housing has a stop mounted thereon to fix at least one of said positions of said choke element.

16. The intake arrangement of claim 15, wherein said stop is defined by said partition wall.

* * * * *